Sept. 29, 1959    R. E. McCAULEY    2,906,193
COFFEE BEVERAGE MAKING MACHINE
Filed Aug. 29, 1956    2 Sheets-Sheet 1

RAYMOND E. MC CAULEY,
INVENTOR.

BY George R. Bliss

Sept. 29, 1959 R. E. McCAULEY 2,906,193
COFFEE BEVERAGE MAKING MACHINE
Filed Aug. 29, 1956 2 Sheets-Sheet 2

RAYMOND E. MC CAULEY,
INVENTOR.

BY George R. Bliss

United States Patent Office 2,906,193
Patented Sept. 29, 1959

2,906,193
COFFEE BEVERAGE MAKING MACHINE
Raymond E. McCauley, Los Angeles, Calif.
Application August 29, 1956, Serial No. 606,804
1 Claim. (Cl. 99—283)

This invention relates to coffee beverage making machines.

Coffee beverage is an infusion of ground coffee beans made by bringing hot water into contact for a brief time interval with the ground coffee. The hot water dissolves the water soluble materials in the ground coffee beans leaving the insolubles behind. These insolubles become the "coffee grounds."

There are three standard methods of accomplishing this infusion.

(1) The ground coffee is enclosed in a bag of flexible material which is immersed in a vessel of the hot water for a period of time and then removed from the vessel. Or the ground coffee may be commingled with the hot water, and afterward separated as by filtering or pouring off the water from the grounds.

(2) The hot water is passed through the coffee grounds which are contained in a basket or other openwork container. If passed through one time only the resulting beverage is called drip coffee. The water may be passed through by gravity or, as in the vacuum coffee makers, elevated by steam pressure into contact with the ground coffee, and then drawn off from the grounds by vacuum suction.

(3) If the water is circulated through the ground coffee several times, the resulting beverage is called percolated coffee.

Whatever the method of bringing together the hot water and ground coffee, there are certain processing variables which determine the characteristics of the resulting coffee beverage. Those variables are:

1. The duration of the roasting treatment.
2. The temperature of the roasting treatment.
3. The length of time between the roasting and brewing operations.
4. The fineness of the grind.
5. The length of time between the grinding and brewing operations.
6. The proportion of ground coffee to water.
7. The temperature of the water during the brewing operation.
8. The length of time of the brewing operation.
9. The purity of the water.
10. The material of the brewing and other equipment with which the water or the coffee beverages comes into contact.
11. Temperature and length of time between the brewing operation and the consumption of the beverage.

Much scientific research has been done to determine the best method and optimum conditions and value of these variables for producing coffee beverage with the most appeal to the taste and liking of the consumers. This research work has established certain facts which are generally accepted by those interested in producing coffee beverage of the highest quality. Much has been published reporting on such research work and drawing conclusions which the research work has established.

Probably one of the most reliable and authoritative of such publications is one entitled "Scientific Coffee Research" by Samuel C. Prescott, professor of Industrial Microbiology and director, Department of Biology and Public Health, of the Massachusetts Institute of Technology, which recites the history of an elaborate project of investigation and research work conducted by the Massachusetts Institute of Technology, and reports the results of that work. The following quotations from this report are pertinent to some of the variables mentioned above.

(1) "Freshly roasted and freshly ground coffee are necessary for the best flavor. Coffee in the bean retains is flavor longer than in ground form." (Page 37.)

(2) "The temperature of the water plays a very important part in coffee making. Actual boiling increases the bitter taste. The most favorable temperatures seem to range from 85° C. to 95° C. (185° F to 203° F.), as at these temperatures the caffein is nearly all dissolved, the flavor-giving oils or ethers are not so largely boiled off and certain changes resulting in bitterness and woody taste are absent or negligible." (Page 36.)

(3) "The time of infusing should be brief. In general, it should not exceed two minutes at the temperatures stated above. One minute is even better. Long infusion, even at the lower tempertures, increases the bitter taste and decreases the flavor and aroma." (Page 36).

(4) "It is a well-known fact that a prepared coffee extract or infusion which has been allowed to stand and then been re-heated is unlike the freshly prepared infusion. It is assumed that losses in the aroma-giving substances take place in this way. It is also possible that other changes may be involved." (Page 12.)

Some of the requisites for making and serving good coffee beverage may be summed up as follows:

1. The use of freshly roasted beans.
2. The use of freshly ground beans.
3. A brewing temperature of 185 to 203 degrees F.
4. A brewing contact time of one or two minutes.
5. Consumption of the coffee beverage while freshly brewed.

There are other considerations upon which however this invention has little or no bearing, and which are therefore not here mentioned or considered.

It is an object of this invention to provide a machine for realizing each and all of the above requisites. It is also an object of the invention to provide a machine which will realize the above requisites for making and serving good coffee beverage in an automatic manner, reducing the need for attention of the operating and/or consuming personnel to a minimum. The invention also has other objects and realizes other advantages which are evident from the following description of the nature of the construction of the machine and the method of its operation.

The machine shown and described herein illustrates one embodiment of the invention. The invention is not limited to this one embodiment but covers all structures and methods of operation set forth in the definitions or, as they are customarily termed, the "claim" which is hereto appended.

Since the individual items of equipment of an apparatus functionally capable of embodying the invention may vary widely in their construction without departing from such embodiment, the invention is portrayed diagrammatically in the accompanying drawings.

Figure 1 of the drawings is a diagrammatic representation of an apparatus embodying the invention.

Figure 1:
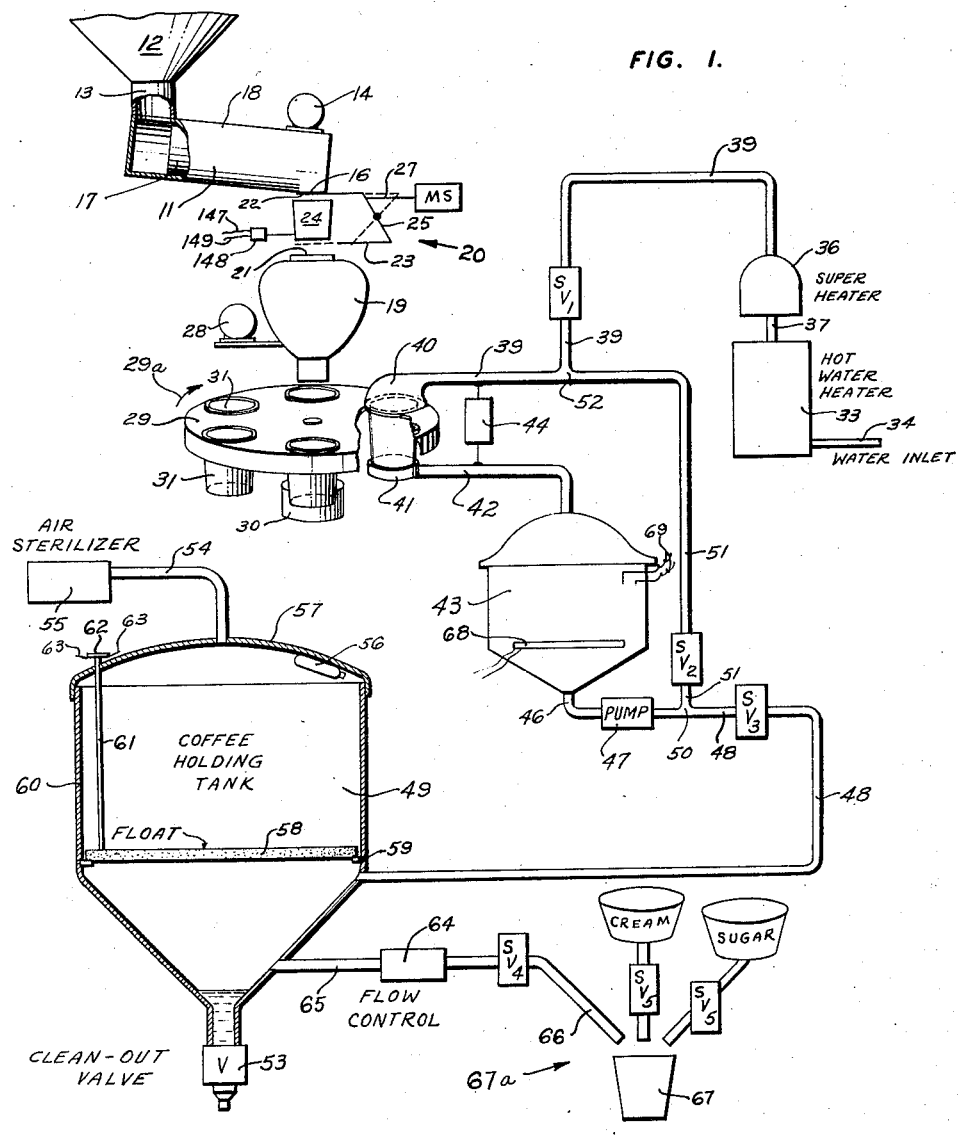

In the following description when an item of the apparatus is referred to by name and a designating reference number it will be understood that the item is shown on the drawings by an appropriate symbolic representation of the item with the associated designating reference number applied thereto in the conventional manner.

A coffee roaster 11, preferably doubly walled, with an inner cylinder 17 revolving within an outer cylindrical casing 18, is in initial processing item of the coffee making apparatus of the invention. While this roaster may be designed to receive the raw coffee beans, preferably a large quantity of the beans are partially roasted and placed in a relatively large bin or compartment 12 from which the beans move by means of gravity or otherwise through the conduit 13 into the upper end of the preferably slightly inclined cylinder 18. The bin 12 is refilled with the green or partially roasted whole beans, as needed, to keep the beans flowing into the receiving end of the roaster. The cylinder 18 is slowly rotated by a preferably electrically operated motor 14, controlled in a manner to be described below.

Mounted within the roaster, as schematically indicated at 15 (see Fig. 3) is an electric heating element which when energized acts to provide the heat for roasting the coffee beans as they proceed along the roaster 11 toward an outlet opening 16 at the lower end of roaster casing 18. This heating element is maintained thermostatically at a proper roasting temperature for intermittent predetermined periods by the control means governing the automatic operation of the apparatus.

Since for proper roasting at the optimum temperature, the beans are subjected to the roasting action for a relatively long period, as for instance 12 to 60 minutes, and since the complete controlled cycle of operation of this machine for brewing a quantity of coffee beverage is relatively short, as for illustration three minutes, it is generally desirable to perform some of the roasting operation prior to the entrance of the beans into the roaster 11. And yet it is desirable to subject the beans to a short final roasting action just prior to grinding the beans and brewing the coffee.

In this machine as shown in the drawings, the design of the roaster and the cyclic control is such as to move the beans the length of the roaster in several short movements, each advancing the beans, for instance a fourth of the length of the roasting cylinder, and during each of which the beans are subjected to a three minute roasting, taking up a fourth of the roasting time, say 12 minutes, which may be required to supplement a main roasting operation to which the beans may have been subjected prior to delivery to the roaster 11. Thus the beans are fully roasted when they reach the grinder, but, due to the roasting just prior to being ground they give off an aroma to please the coffee drinkers nearby, and have the full rich flavor of freshly roasted and freshly ground coffee.

The fully and freshly roasted beans are fed intermittently into a grinder 19 in measured batches of equal quantity by a measuring device generally indicated by the numeral 20, which is interposed between the opening 16 and an opening 21 in the top of the grinder 19. This measuring device 20 is diagrammatically represented as having a valve plate 22 mounted to reciprocate slidably between a first position in which it closes the opening 16 and a second position in which it uncovers this opening. The measuring device also has a similarly reciprocatable slide valve 23 movable between a position in which it closes, and a position in which it uncovers, the lower open end of a measuring cup 24. The upper, also open, end of this cup is directly below and slightly spaced vertically from the roaster casing opening 16.

The slide valves 22 and 23 are power moved simultaneously but in opposite directions by any suitable means, such as that diagrammatically illustrated in Figure 1 of the drawing, whereon is shown a centrally pivoted lever 25 to the ends of which are suitably connected the valves 22 and 23. An electric solenoid MS having a spring return armature 27 is suitably connected to the lever 25. The solenoid is electromagnetically actuated by the control system of the apparatus. The grinder 19 is operated by an automatically controlled electric motor 28.

Below the grinder is rotatably mounted a horizontally disposed circular table 29 which is intermittently rotated through a small arc by an automatically controlled motor 30. This table is formed to support in an annular row a series of equally spaced elongated cylindrical cup-like containers 31. The vertical axis of rotation of the table is so positioned that these containers 31 pass successively under the lower open end of the grinder 19, and the motor 30 is so controlled as to halt the movement of the table intermittently with the upper open end of each container in vertical axial registry with the discharge opening of the grinder. The table moves each time it is actuated by the motor 30 over an arc equal to the arcuate angle on centers between the containers. In the drawings, for example, each intermittent movement of the table 29 is through an angle of 60 degrees, since the table is designed to hold six ground coffee containers, around its rim.

Figure 2:
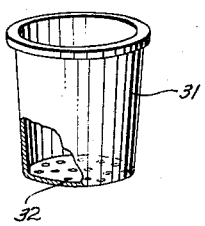
Figure 2 is a perspective view of one of the ground coffee containers broken away to better illustrate its construction.

As is shown in Figure 2 the containers 31 are open topped and provided with perforated bottoms 32. They are readily removable from the holder table 29 for cleaning and filling.

Water is supplied to a water heater 33 through a conduit 34 from an available water source. This water heater is made with a thermostatically controlled electric heater element 35 (see Figure 3) which is turned on and off preferably by a master switch 45 of the control system of the coffee maker. (See Figure 3.) From the heater 33 the hot water is conducted through a conduit 37 to a superheater 36 which is likewise provided with a thermostatically controlled heater element 38 (see Figure 3) which may be turned on and off by the master switch 45 of the control system. From the superheater the water is conducted through a conduit 39, in which the flow is controlled by a solenoid operated valve SV1, to and into the upper cover element 40 of a water tight sealing device. The lower cover element of this sealing device is designated 41. These two elements are movable vertically toward and away from each other and toward and away from sealing contact with the upper and lower rims of the container 31 which is axially alined between them. This relative movement of the elements 40 and 41 with respect to each other and to the container in the table 29, a movement which takes place without allowing leakage between either of the elements and the adjacent conduit which communicates with the element, may be accomplished by any convenient means as by use of short lengths of flexible conduit adjacent the communicating junctions. The rims of the elements 40 and 41 may be surfaced inside with soft linings to prevent leakage when in contact with the adjacent rim of the container 31.

The lower cover element 41 communicates with the conduit 42 which leads to an opening in the top of the percolator and metering tank 43. The cover elements 41 and 42 are moved toward each other and in a fluid tight clamping position on the container 31 by the normalizing of a spring return solenoid 44. The clamping relation is released by the energization of this solenoid, overcoming the action of the normalizing spring of the solenoid 44 (not shown). As will be later set forth, the clamping and unclamping movement of the cover elements is co-ordinated with the intermittent arcuate movements of the container holding table 29 in such manner as to unclamp the cover elements at those intervals of time during which the table is undergoing a rotational movement.

A conduit pipe 46 connects the bottom of the percolator tank 43 to a preferably electrically driven water pump 47. A conduit pipe 48 connects the outlet of the pump 47 to a coffee hodling and dispensing tank 49. The pipe 48 discharges into the tank 49 at a level substantially nearer the bottom than it is to the top of this tank 49. A solenoid shut-off valve SV3 controls the flow of liquid in the conduit 48.

At 50 on the pipe 48 a conduit pipe 51 is teed into pipe 48. This conduit 51 communicates with pipe 39 at 52. A solenoid shutoff valve SV2 controls the flow of liquid in conduit 51 between points 50 and 52.

The coffee holding tank 49 is preferably generally cylindrical in shape with its lower end conically shaped and having a clean-out valve opening 53 at the lower end of the cone. It is preferably provided in its cover wall with an air vent pipe 54 which is equipped at its outer end with a sterilizer 55. Also a germicidal lamp 56 may be mounted on the under face of the tank cover 57.

A float 58 of a specific gravity less than water, rides on the top of any body of coffee beverage which may be in the tank 49. Its downward movement in the tank is limited by stops 59 on the side walls 60 of the tank at a level just above the discharge opening of the conduit pipe 48. The float supports a vertical rod 61 which projects upwardly through a small opening in the lid 57 and carries a switch closing conductor 62 at its upper end. This conductor is lowered into closing contact with the switch elements of an electric switch 63 (see Figure 3) as the float contacts the stops 59.

Near the bottom of the holding and dispensing tank 49 a discharge conduit pipe 65 is communicatively connected to the interior chamber of the tank and leads from the tank through a constant flow control valve 64 and a shut-off solenoid valve SV4 to a discharge spout 66 in position to fill a cup or other vessel placed beneath it. The equipment group designated generally by the numeral 67ª represents a conventional means, well known to those skilled in the art of coffee beverage dispensing, for customer four-way push-button control of the beverage to provide either black coffee, coffee with cream alone, coffee with sugar alone, or coffee with cream and sugar.

Solenoid valves SV1, SV2, SV3, and SV4 are normally spring closed.

The percolator tank 43 is equipped with a thermostatically controlled heater element 68 for maintaining the proper percolating temperature in the tank. It is also provided with a pair of electrode terminals 69 which act as a fluid switch to complete an electric circuit across them, when liquid rises to the level of these terminals in the tank.

Figure 3:
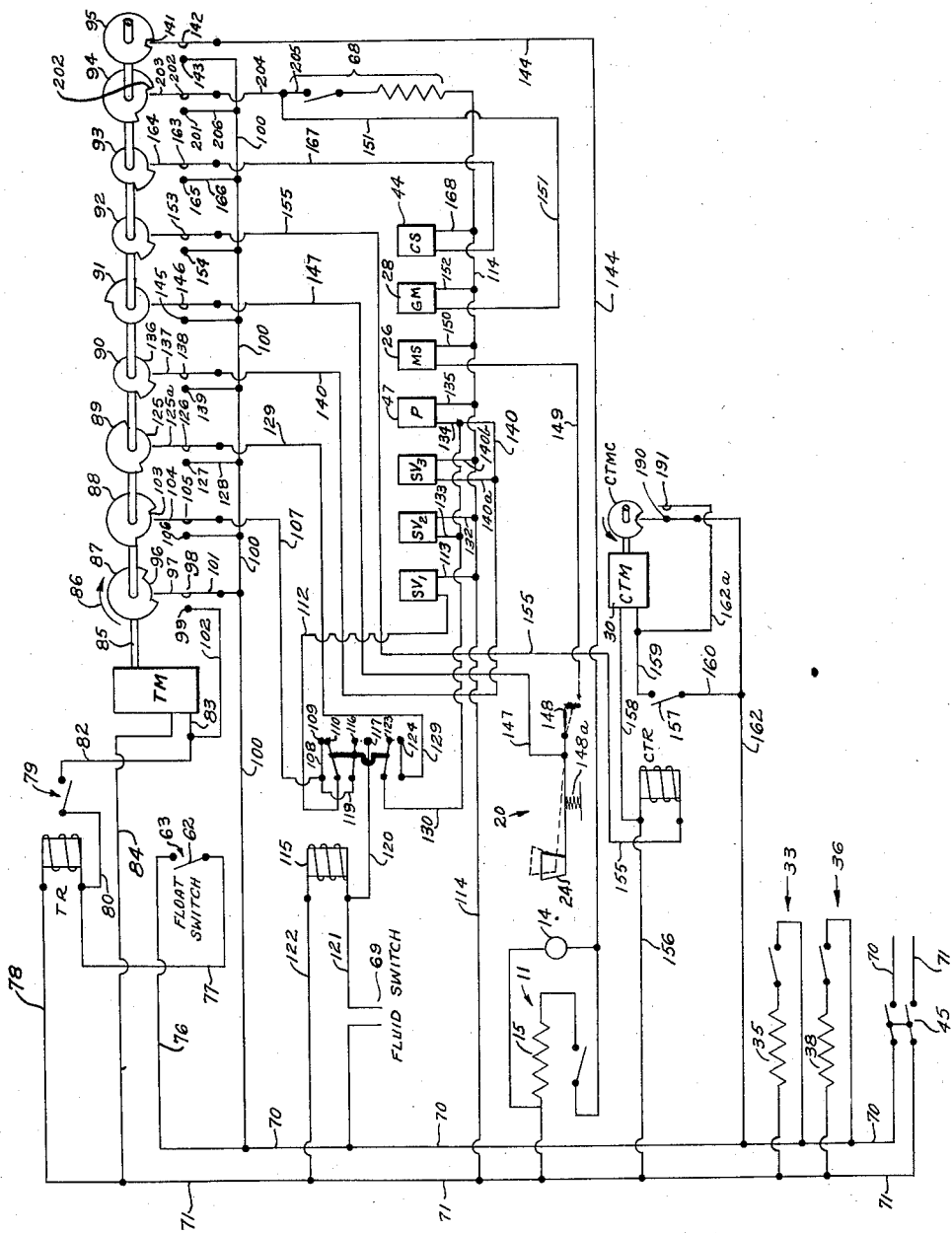
Figure 3 is a schematic diagram of the electrical control equipment for the apparatus diagrammatically shown in Figure 1.

The control system of the coffee making machine is shown in Figure 3. The coffee making apparatus comprises a water heating equipment, coffee bean processing equipment, a percolating equipment and a dispensing equipment.

The control system for the machine is electrical, consisting of two main feeder lines 70 and 71 with the several components of the control equipment connected in parallel to these feeder lines. The water heating equipment, both the water heater proper and the superheater, are energized whenever the main master switch 45 is in the on position. These heaters are in operation continuously whenever the machine is being used.

The items of the bean processing equipment and those of the percolating equipment are operated in a chronometrically controlled cycle, the several steps of the bean processing and of the percolating operation being tied together under a single co-ordinated and partially simultaneous control. The dispensing part of the machine is controlled by the customer.

On Figure 3 the two water heating circuits 33 and 36 are shown on the lower portion of the figure. The control apparatus for the bean processing and percolating operations are shown on the upper portion of the sheet, the various elements of this control system being all supplied with current from the main feeder lines 70 and 71 shown extending vertically from the bottom to the top of the sheet and at the left hand end of the sheet.

The chronometric cycle of steps of the bean processing and percolating operations is initiated whenever there occurs a need for a renewed supply of beverage coffee in the coffee holding tank 49. When the float 58 reaches the lowermost level in the tank 49 and rests upon the stops 59, the switch 63 is closed. This is schematically indicated on Figure 3. The closing of this switch permits current to flow from the main conductor 70 over conductor 76, through the switch 63—62, conductor 77 to a timer relay TR, conductor 78 back to the other main conductor 71. The timer relay coil is energized and closes switch 79 permitting curernt to flow over conductor 80, through switch 79, conductor 82 and 83 to the timer motor TM, thence over conductor 84 to the return main line 71.

When the timer motor TM begins operation it rotates a shaft 85 in the direction of the arrow 86. Upon this shaft are fixedly mounted nine cams 87 to 95 inclusive, which make and break the various circuits controlling items of the bean processing and percolating equipment. The cycle of steps of this combined operation of bean processing and percolating are sequentially completed upon one revolution of the shaft 85.

It will be observed that the float switch 62—63 might be opened by the elevation of the coffee beverage in the tank 49 prior to the completion of the cycle. To obviate this the cam 87 serves to connect the timing motor TM between the trunk conductor lines 70 and 71 independently of the switch 62—63 and to disconnect the timing motor at the end of the cycle. The cam 87 has a recessed arc 96 in its otherwise circular rim. The unrecessed portion of this and the other cams are hereinafter referred to as the cam lobes and identified by the same reference number as the cams. An arm 97 which is spring-biased to its right hand position as shown on the drawing (as are all the other eight spring arms), is urged to the left when the leading edge of the lobe 87 contacts the upper end of the arm 97, bringing contact button 98 against contact button 99 and completing a circuit by way of conductors 100, 101, 102 and 83 to the timing motor TM and thence by the way of the conductor 84 to the trunk line 71. When the trailing edge of the cam lobe 87 allows the arm 97 to return to its normal position in which the conductor buttons 98 and 99 are separated, the timing motor TM is de-energized, since, substantially before that time, as will be later explained, the level of the coffee beverage in the tank 49 had been already elevated sufficiently to insure the opening of the float switch 63.

Cam 95 which has a short recess 141 in its otherwise smooth rim, in the same manner as just described in connection with cam 87, brings the contact button 142 against contact button 143 completing a circuit from trunk line 70 through conductor 100, to the contact buttons 143, 142, thence by way of conductor 144 to the roaster 11. The current flows and energizes the motor 14 which rotates the inside cylinder 17 of the roaster and also flows through and energizes the thermostatically controlled heater element 15 of the roaster, the current in each case returning to the trunk line 71. Since cam lobe 95 is nearly 360° in length, it will be seen that a small batch of the partially roasted beans is further roasted to completion during the interval of time required for one rotation of the timer shaft 85. Assuming as related above, that this period is approximately three minutes, the operation of the final completing roasting of the beans is of sufficient duration to develop an aroma which both calls attention of the customer to the machine, and gives the portion of coffee which is next percolated a fresh aroma and flavor.

Cam 91 operates in a manner similar to cams 87 and 95 to connect the measuring solenoid MS in a circuit consisting of conductor 100, contact buttons 145 and 146, conductor 147, switch 148, conductor 149, the solenoid MS, conductor 150 to conductor 114 and return trunk line 71. Switch 148 is held in its lowermost position in which it connects conductor 147 to 149, by a compression spring 148ª which acts to hold the measuring cup 24 in its uppermost position when the cup is empty (shown in dotted lines). Energization of the solenoid MS pulls the upper slide valve 22 to the right and pushes the slide valve 23 to the left allowing the fresh completely roasted beans to fall from the roaster into the measuring cup 24 where they are prevented from falling into the grinder 19 by the slide valve 23. The cup made heavier by the weight of the coffee shifts the switch 148 to the upper position in which the switch disconnects and de-energizes the measuring solenoid MS, which allows the spring return armature 27 to reverse the positions of the slide valves 22 and 23 allowing the coffee to drop into the grinder which has been previously turned on by cam 94 as will be later explained.

The trailing end of lobe 91 resets the buttons 145, 146 for contact upon the next revolution of the shaft 85, the lobe 91 being just long enough to allow the spring held valve 22 to allow enough beans to enter the cup to compress the spring 148ª to move the cup downward to break the switch at 148. At this juncture the valve 23 opens and the valve 22 closes simultaneously, the coffee in the measuring cup drops into the grinder, and the cup returns to its upper position ready for the next filling thereof.

Cam 94 controls the operation of the percolator heater 68 and the grinder motor 28. The leading end 202 of the cam lobe 94 moves the spring biased switch arm 203 bringing the conductor buttons 202 and 201 into contact and closing the circuit 70, 100, 206, contacts 201 and 202, conductors 204, 205, thermostatically controlled heater 68 of the percolator, and conductor 144 to the feeder main line conductor 71. Movement of the switch arm also closes the branch circuit from 204 through 151 to the grinder motor 28 and thence back to the main line by conductors 152 and 114.

Thus the grinder is caused to grind the charge of whole beans last dropped from the measuring cup, in readiness for dumping it into a container 31, and the percolator is brought up to its proper temperature and thermostatically maintained at that temperature during the flow of hot water therethrough, during the brewing of the preceding charge of ground coffee. The cam lobe 94 is of sufficient arcuate length to give the proper time duration to the grinding operation, and to the maintenance of the heating of the percolator tank during the percolating operation.

Cams 88, 89 and 90 control the flow of hot water during the percolating operation. But prior to the circulation of the hot water incident to percolation, the ground coffee must be in readiness in one of the containers 31 for the passage of the hot water and then the grounds must be removed from the path of the hot water after the operation of percolation has been completed.

To accomplish this purpose and assuming that that one of the containers 31 which is under the grinder at the time, contains unbrewed ground coffee, then, cam 92 toward the end of the cycle period brings into contact buttons 153 and 154 to close a circuit consisting of conductor 100, conductor 155, the coffee table relay CTR, conductor 156, to trunk line 71. Energization of CTR closes a switch 157 which energizes the coffee table motor CTM through conductor 162, conductor 160, switch 157, conductor 159, CTM, conductors 158, 156, to trunk line 71.

Further rotation of the cam 92 allows the switch arm and contact button 153 to spring away from and break contact with button 154 which de-energizes the relay CTR, opening the normally opened switch 157. But CTM is held on through a complete cycle by its own control cam, CTMC, through the following circuit; conductor 162, normally opened switch buttons 190, 192, conductor 162ª to CTM and return conductor 158, 156 to trunk line 71. A complete revolution of CTM is geared to cause the coffee table 29 to turn through an arc of 60°, bringing the next coffee container 31 into the percolating position and moving the last coffee container 31 out of the percolating position.

Cam 93 acts to bring button 163 on switch arm 164 into contact with button 165 to complete a circuit from trunk line 70 to conductor 100, conductor 166, buttons 165 and 163, conductor 167, to the clamping solenoid CS thence by way of conductor 168 to the conductor 114, and thence to trunk line 71. Thus the clamping solenoid CS is energized and releases the elements 40 and 41 which are normally spring held against the upper and lower ends, respectively, of a container 31 which will then be moved out of position by the action of cam 92 on the motor CTM which turns the coffee table 29, bringing the next container 31 into percolating position.

When the CTM has moved the next container in position the cam lobe 93 and the cam CTMC are so designed that solenoid CS 44 is de-energized allowing the spring returned armature of this solenoid to place the clamping elements 40 and 41 in clamping position on the next container 31.

The leading end 103 of the lobe on cam 88 brings together contact button 105 on switch spring arm 104, and button 106, to complete a circuit from conductor 100 to conductor 107 and thence to conductor 108, normally closed switch buttons 109—110, conductor 112 to the valve operating solenoid SV1, thence by way of conductor 113 to conductor 114 and trunk line 71. Completion of this circuit energizes the solenoid valve SV1 and permits flow of hot water from the heater 33 and superheater 36 through conduit 39 to the clamping element 40, through the container 31 filled with freshly ground coffee, thence through the clamping element 41, conduit 42, to the percolator tank 43. At this juncture, solenoid valve SV2 is closed as is also solenoid valve SV3 and the pump 47 is not in operation. The clamping solenoid 44 at this juncture is de-energized and the clamping elements 40 and 41 are spring held in closed position upon the container 31 between them.

When the hot water flowing through the conduit, as just described, fills the percolator to a level near the top of the percolator tank, contacts 69 are bridged by the rising body of liquid completing the circuit through this fluid switch 69 and energizing the relay 115 through the conductors 121 and 122. The energization of relay 115 opens the normally closed contacts 109 and 110 and closes the normally opened contact 116 and 117, and also the normally opened contacts 123 and 124.

The opening of the switch contacts 109—110 closes the solenoid valve SV1. Closing of the switch contact 116—117 completes the circuit from conductor 107 through conductor 119 and conductor 120, through relay 115 and conductor 122 to the trunk line 71 which results in holding the relay switch 115 in its new position irrespective of the condition of the fluid switch 69. Closing of the normally opened contacts 123—124 prepares a circuit which operates the solenoid valve SV2 and the pump 47. This circuit from trunk line 70 and conductor 100, conductors 128—129, 130, 133, to solenoid valve SV2, and thence by conductors 132 and 114 back to trunk line 71, is completed by the action of cam 89 closing contacts 126 and 127. The pump 47 is also connected in multiple in this last mentioned circuit. Since the valve SV3 is in closed position, at this juncture, and SV1 is also closed, the opening of valve SV2 and operation of the pump 47 causes a flow of hot water in a closed conduit circuit through the container 31 with the resultant brewing of coffee by the percolating method.

Cam 90 operates to close the switch contact buttons 138—139 completing a circuit from trunk line 70 by way of conductor 100, contact buttons 138—139, conductor 140, 140ª, to solenoid operated valve SV3 and by way of a return circuit 140ᵇ, and conductor 114 to trunk line 71. The solenoid valve SV3 is thereby opened. Through another circuit by way of conductors 134—135 connected in multiple with the last mentioned circuit, the flow of the current to the pump P is maintained, enabling the pump to empty the percolator tank 43 and fill the coffee holding tank 49. As the coffee beverage flows through the conduit 48 into the coffee holding tank 49, it elevates the float 58 and rod 61 opening the switch 62—63. The cam 87 having completed its revolution breaks the contact between contact buttons 98 and 99. Since both circuits by which the current may flow through the timer relay TR are broken, the cycle operating mechanism is brought to a standstill in readiness for its next operation when the float 58 is lowered in the tank 49 to the level of the stops 59 by withdrawal of coffee beverage into the cup 67 or other vessel into which the beverage is discharged.

We will assume that the master switch 45 is closed and that the machine has been operating. We will further assume that the float 58 is about to contact the stops 59 and close the switch 62—63. At this juncture one of the containers 31 is located in the path of the flow of the hot water, is filled with freshly ground unbrewed coffee and the clamping elements 40 and 41 are in clamping position at the top and bottom of the container. The switch 62—63 starts the timer motor TM which then makes one complete revolution and by means of the cams mounted upon its shaft and by means of the other control devices described above, causes the following two sequences of events to occur.

(1) The roaster 68 is energized and its inner cylinder rotated during the entire duration of the cycle.

(2) The coffee brewing cycle proceeds simultaneously with the cycle of operative steps by which a portion of coffee beans is measured, ground and loaded into a container next in position on the coffee table to the position of the container which is being used in the coffee brewing operation.

Both of these simultaneously conducted cycles are initiated by the need for a fresh supply of coffee beverage in the coffee holding tank and are completed automatically by a self terminating chronometric control.

The cam lobes on the cams 87 to 95 are angularly adjustable on the shaft 85 so that the control mechanism may be accurately set to effect the several steps of the coffee making process in proper sequence and in proper co-ordination with each other. The terminals of the switch 69 may be vertically adjustable to provide for the regulation of the quantity of coffee beverage which may flow into the percolator tank for each brewing cycle. For the fluid switch terminates the cycle and in that way measures the volume of the charge of liquid of the successive brews which are processed and discharged into the coffee holding tank 49. The maximum charge which tank 43 may hold before the flow into it is stopped by the switch 69 must not exceed in volume that of the tank between the float 58 and the cover 57, and is preferably of about the same volume. It would so show, if Figure 1 of the drawings was drawn exactly to scale, instead of being diagrammatic in character. The volume of the chamber portion of tank 49 below the level of the float 58 and stops 59 is sufficient to hold enough brewed coffee to make the probable number of cups of coffee which would likely be consumed during the brewing period cycle, which might be one, two, three or more minutes according to the regulatory adjustment of the machine as dictated by the desires of the machine operator.

The float 58 both serves to actuate the switch 62, 63 and to seal the upper surface of the coffee beverage in the tank from the oxidizing action of the air above the float and to protect the upper surface of the beverage in the tank 49 from deleterious action of impurities in the ambient air.

The machine of this invention and the coffee making method of which it is capable, is adaptable to other brewing operations than that of percolation. The drip brewing method may be substituted for the percolating method. In that case, the containers 31 will preferably be deeper and of smaller diameter, the cams and other control mechanism would be adjusted to pump a continuous and steady stream of hot water through the container from the time the cycle is initiated by the action of the float switch 62, 63 until it is terminated by the action of the fluid switch 69.

The five major requisites of good coffee, i.e. fresh roasting, fresh grinding, accurately regulated low brewing temperature, short brewing time, short period between brewing and consumption, are all capable of realization in a machine constructed in accordance with this invention, and are so realized automatically after the machine is properly set and properly initially regulated.

I claim:

In a coffee beverage making machine, the combination of: a roaster characterized by a travel path of the green beans therethrough in a predetermined time interval, and by a thermostatically controlled heater which acts upon the beans during this travel period; means for moving the beans through the roaster; a roasting heater mounted and thermostatically controlled to apply heat at a constant temperature to the beans as they travel through the roaster; a bean metering device mounted at the discharge end of the roaster capable at each operation thereof of measuring for discharge and discharging from the roaster only a relatively small fractional portion of the beans which the roaster is capable of containing when full; a grinder mounted to receive from the metering device the said fractional portions of the roasted beans; a containing means mounted to receive the said fractional portions of roasted and ground beans; means for contacting the beans of each of said fractional portions while in said container with hot water at brewing temperature to produce a brewed coffee infusion; and a control means for intermittently operating said heater, for intermittently operating said metering device, which in turn causes a discharge of a metered batch of said beans from the roaster and a consequent intermittent movement of the beans in the roaster over a portion only of their travel path, said control means coordinating the heating period with the metering and bean moving period, said control means also operating said grinder and brewing means in sequential coordination with the roasting and metering equipment.

References Cited in the file of this patent

UNITED STATES PATENTS

| | | |
|---|---|---|
| 399,803 | Wagner | Mar. 19, 1889 |
| 1,467,778 | Paola | Sept. 11, 1923 |
| 1,508,809 | White | Sept. 16, 1924 |
| 1,805,159 | Bauer et al. | May 12, 1931 |
| 1,896,230 | Farago | Feb. 7, 1933 |
| 2,014,325 | Grilli | Sept. 10, 1935 |
| 2,098,961 | Fronmuller | Nov. 16, 1937 |
| 2,282,708 | Dantzig | May 12, 1942 |
| 2,295,920 | Vermillion | Sept. 15, 1942 |
| 2,360,838 | Atti | Oct. 24, 1944 |
| 2,420,615 | Palmer et al. | May 13, 1947 |
| 2,514,596 | Crossley et al. | July 11, 1950 |
| 2,581,148 | Scu'l et al. | Jan. 1, 1952 |
| 2,761,200 | Arnett | Sept. 4, 1956 |

FOREIGN PATENTS

| | | |
|---|---|---|
| 606,520 | Germany | Dec. 4, 1934 |